(12) United States Patent
Radosta et al.

(10) Patent No.: US 7,660,577 B2
(45) Date of Patent: Feb. 9, 2010

(54) NETWORK TESTING SYSTEMS AND METHODS

(75) Inventors: Chris R. Radosta, Cumming, GA (US); Mark Horton, Suwanee, GA (US); Christopher T. Schenken, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 793 days.

(21) Appl. No.: 10/947,548

(22) Filed: Sep. 22, 2004

(65) Prior Publication Data

US 2005/0101268 A1    May 12, 2005

Related U.S. Application Data

(60) Provisional application No. 60/505,036, filed on Sep. 22, 2003, provisional application No. 60/505,822, filed on Sep. 24, 2003.

(51) Int. Cl.
*H04W 24/00*    (2006.01)

(52) U.S. Cl. .................... 455/424; 455/423; 455/556.1; 455/554.2

(58) Field of Classification Search ............. 455/554.2, 455/556.1, 423, 424, 425, 67.13, 67.14, 67.11
See application file for complete search history.

(56) References Cited

U.S. PATENT DOCUMENTS

| 3,822,049 A | 7/1974 | Saunders |
| 4,113,217 A | 9/1978 | O'Connell |
| 4,124,815 A * | 11/1978 | Stoschek .................... 455/517 |
| 4,977,399 A | 12/1990 | Price et al. |
| 5,023,900 A | 6/1991 | Tayloe et al. |
| 5,095,500 A | 3/1992 | Tayloe et al. |
| 5,398,276 A | 3/1995 | Lemke et al. |
| 5,451,839 A | 9/1995 | Rappaport et al. |
| 5,481,588 A | 1/1996 | Rickli et al. |
| 5,490,204 A | 2/1996 | Gulledge |
| 5,490,288 A | 2/1996 | Wiatrowski |

(Continued)

FOREIGN PATENT DOCUMENTS

EP    0 977 450 A2    2/2000

(Continued)

OTHER PUBLICATIONS

"TEMS Automatic WCDMA, Take Control of Your Mobile Internet Quality of Service", 2001, 2 pages, (available at http:\\www.ericsson.com/services/tems/downloads/ds_automatic_wcdma.pdf).

(Continued)

*Primary Examiner*—Edward Urban
*Assistant Examiner*—Christian A Hannon
(74) *Attorney, Agent, or Firm*—Alston & Bird, LLP

(57) ABSTRACT

The present invention is directed at systems and methods for gathering wireless communication data within a target geographic area. More specifically, selected fleet vehicles are equipped to gather wireless communication data from transmission towers while simultaneously performing other tasks. A signal testing device gathers the signal data while temporarily positioned in a selected fleet vehicle that passes within a target geographic area. The signal testing device is then transferred to other fleet vehicles that also traverse the target geographic area until the desired data from the identified area is collected.

25 Claims, 9 Drawing Sheets

U.S. PATENT DOCUMENTS

| | | | |
|---|---|---|---|
| 5,561,839 | A | 10/1996 | Österberg et al. |
| 5,644,623 | A | 7/1997 | Gulledge |
| 5,694,451 | A | 12/1997 | Arinell |
| 5,706,333 | A | 1/1998 | Grenning et al. |
| 5,710,758 | A | 1/1998 | Soliman et al. |
| 5,752,164 | A | 5/1998 | Jones |
| 5,764,726 | A | 6/1998 | Selig et al. |
| 5,768,689 | A | 6/1998 | Borg |
| 5,859,894 | A | 1/1999 | Perez et al. |
| 5,867,785 | A | 2/1999 | Averbuch et al. |
| 5,913,162 | A | 6/1999 | Gourdin et al. |
| 5,920,607 | A | 7/1999 | Berg |
| 5,926,762 | A * | 7/1999 | Arpee et al. ............... 455/447 |
| 5,930,707 | A | 7/1999 | Vambaris et al. |
| 5,946,612 | A | 8/1999 | Johansson |
| 5,987,306 | A | 11/1999 | Nilsen et al. |
| 5,991,622 | A | 11/1999 | Henry, Jr. |
| 6,052,584 | A | 4/2000 | Harvey et al. |
| 6,157,838 | A | 12/2000 | Di Huo et al. |
| 6,167,272 | A | 12/2000 | Hellstern |
| 6,169,896 | B1 | 1/2001 | Sant et al. |
| 6,201,960 | B1 | 3/2001 | Minde et al. |
| 6,246,880 | B1 | 6/2001 | Iizuka |
| 6,272,337 | B1 | 8/2001 | Mount et al. |
| 6,285,876 | B1 | 9/2001 | Zhong |
| 6,298,233 | B1 | 10/2001 | Souissi et al. |
| 6,308,064 | B1 | 10/2001 | Green |
| 6,315,255 | B1 | 11/2001 | Chan et al. |
| 6,330,428 | B1 | 12/2001 | Lewis et al. |
| 6,332,076 | B1 | 12/2001 | Shah et al. |
| 6,336,035 | B1 * | 1/2002 | Somoza et al. ............. 455/446 |
| 6,356,531 | B1 | 3/2002 | Soliman |
| 6,400,690 | B1 | 6/2002 | Liu et al. |
| 6,411,806 | B1 | 6/2002 | Garner et al. |
| 6,424,837 | B1 | 7/2002 | Hall et al. |
| 6,434,364 | B1 | 8/2002 | O'Riordain |
| 6,449,485 | B1 | 9/2002 | Anzil |
| 6,466,797 | B1 | 10/2002 | Frodigh et al. |
| 6,484,096 | B2 | 11/2002 | Wong et al. |
| 6,507,737 | B1 | 1/2003 | Laham et al. |
| 6,519,452 | B1 | 2/2003 | Agostino et al. |
| 6,556,832 | B1 | 4/2003 | Soliman |
| 6,560,442 | B1 | 5/2003 | Yost et al. |
| 6,567,381 | B1 | 5/2003 | Jeon et al. |
| 6,570,529 | B2 * | 5/2003 | Richton et al. ......... 342/357.02 |
| 6,587,690 | B1 | 7/2003 | Di Huo et al. |
| 6,603,966 | B1 | 8/2003 | Sheffield |
| 6,711,404 | B1 * | 3/2004 | Arpee et al. ............... 455/423 |
| 6,711,408 | B1 | 3/2004 | Raith |
| 6,853,842 | B1 * | 2/2005 | Wilson et al. ............. 455/423 |
| 6,915,128 | B1 * | 7/2005 | Oh ............................ 455/424 |
| 6,928,280 | B1 * | 8/2005 | Xanthos et al. ........... 455/423 |
| 6,931,235 | B2 * | 8/2005 | Kline et al. ............. 455/67.11 |
| 7,062,264 | B2 * | 6/2006 | Ko et al. .................... 455/423 |
| 7,099,669 | B2 * | 8/2006 | Sheffield .................... 455/446 |
| 7,113,793 | B2 * | 9/2006 | Veerasamy et al. ....... 455/456.1 |
| 7,236,779 | B2 * | 6/2007 | Lahav et al. ............... 455/423 |
| 2002/0029108 | A1 | 3/2002 | Liu et al. |
| 2003/0014286 | A1 | 1/2003 | Cappellini |
| 2003/0083115 | A1 | 5/2003 | Kato |
| 2003/0224806 | A1 * | 12/2003 | Hebron ...................... 455/457 |

FOREIGN PATENT DOCUMENTS

| | | |
|---|---|---|
| JP | 3251351 | 11/1991 |
| JP | 3062509 | 7/1999 |
| JP | 2000059292 | 2/2000 |
| JP | 2000295168 | 10/2000 |
| JP | 2001024577 | 1/2001 |
| JP | 2001218252 | 8/2001 |
| JP | 2002112302 | 4/2002 |
| JP | 2002335202 | 11/2002 |

OTHER PUBLICATIONS

"TEMS Drive Tester CDMA, An Innovative Drive Test Solution," 2001, 2 pages, (available at http:\\www.ericsson.com/service/internet/picov/get? DocNo=28701-FAP9010100).

"TEMS™ Automatic WCDMA: Take Control of Your Mobile Internet Quality of Service," www.ericsson.com; Publication AE/LZT 123 6694 R1; date of publication unknown (copyright 2001); two pages.

"TEMS™ Drive Tester CDMA: An Innovative Drive Test Solution," www.ericsson.com/terms; Publication AE/LZT 123 7307, R3; date of publication unknown (copyright 2003); four pages.

Sigler, Lisa; "Assess speech quality with PESQ, now in TEMS™ Automatic;" date of publication unknown; one page.

"TEMS™ Automatic: Streamlined Operations and Improved QoS: GSM/GPRS, CDMA, and TDMA," www.ericsson.com/tems: Publication 287 01-FAP 901 0409 B; date of publication unknown (copyright 2004); four pages.

"TEMS™ —Making Wireless Better," by Ericcson; APAC Workshop (Sep. 2004); seventeen pages.

"TechNotes: Tools for Precision: A Tool Kit to Optimize WCDMA Networks," www.ericsson.com/tems; date of publication unknown; one page, numbered p. 46.

Sigler, Lisa, Editor; "TEMS™ News," an Ericsson Newsletter (No. 2, Jun. 2003); eight pages.

Sigler, Lisa, Editor; "TEMS™ News," an Ericsson Newsletter (No. 2, Q2 2004); eight pages.

Sigler, Lisa, Editor; "TEMS™ News," an Ericsson Newsletter (No. 3, Q3 2004); eight pages.

Hedin, Lars-Göran, Editor; "On: The New World of Communication," an Ericsson global customer magazine (Mar. 2002); fifty pages.

"TEMS™ Tech Support: TEMS Automatic GSM: Take Control of Your Mobile Internet Quality of Service," www.ericsson.com/services/tems/support/sup_automatic_gsm.shtml; date of publication unknown; three pages.

"TEMS™ Automatic: Making Wireless Better: Take Control of Your Mobile Internet Quality of Service," www.ericsson.com/services/tems/cdma/automatic-cdma.shtml; date of publication unknown; two pages.

"TEMS™ Tech Support: TEMS DriveTester CDMA: Making Wireless Better: Instantly Isolate Network Trouble Spots," www.ericsson.com/services/tems/support/drivetester/sup_drivetester_cdma.shtml; date of publication unknown; two pages.

"TEMS™ Tech Support: TEMS DriveTester GSM/TDMA: Making Wireless Better: Instanty Isolate Network Trouble Spots," www.ericsson.com/services/tems/support/drivetester/sup_drivetester_gsnm_tdma.shtml; date of publication unknown; two pages.

"TEMS™ Tech Support: TEMS LinkPlanner: Making Wireless Better: FAQ's," www.ericsson.com/services/tems/support/linkplanner/sup_linkplanner_faq_import.shtml; date of publication unknown; two pages.

"TEMS™ Tech Support: TEMS LinkPlanner: Making Wireless Better: FAQ's: Map Data," www.ericsson.com/services/tems/support/linkplanner/sup_linkplanner_faq_mapdata.shtml; date of publication unknown; one page.

"TEMS™ Tech Support: TEMS LinkPlanner: Making Wireless Better: FAQ's: General," www.ericsson.com/services/tems/support/linkplanner/sup_linkplanner_faq_general.shtml; date of publication unknown; one page.

"TEMS™ Drivetester CDMA2000 2.0: An Innovative Drive Test solution for CDMA Networks," www.ericsson.com/products/TEMSdrivetesterCDMA200020pos.shtml; date of publication unknown; one page.

"TEMS™ Drive Tester CDMA: An Innovative Drive Test Solution," www.ericsson.com/tems; Publication 287 01-FAP 901 0539 Uen; date of publication unknown (copyright 2005); four pages.

Translation of Office Action dated Dec. 9, 2008, Japanese Application No. 2006-528107, filed Sep. 22, 2004.

International Search Report dated Feb. 24, 2005, for International patent application PCT/US2004,030934, filed Sep. 22, 2004.

Office Action dated Sep. 19, 2008, U.S. Appl. No. 10/763,875, filed Jan. 23, 2004.
Office Action dated Feb. 25, 2008, U.S. Appl. No. 10/763,875, filed Jan. 23, 2004.
Office Action dated Jul. 18, 2007, U.S. Appl. No. 10/763,875, filed Jan. 23, 2004.
Office Action dated Feb. 24, 2009, U.S. Appl. No. 10/763,875.
Translation of Office Action dated Mar. 6, 2009, China Patent Application No. 20048027419.0, filed Sep. 22, 2004.
International Search Report Dated Feb. 24, 2005, PCT Application No. PCT/US2004/030930, filed Sep. 22, 2004.

* cited by examiner

NETWORK TESTING SYSTEMS AND METHODS

CROSS-REFERENCE TO RELATED APPLICATIONS

The present application claims the full benefit and priority of pending U.S. provisional patent Application No. 60/505,036, filed Sep. 22, 2003, entitled "System and Method of Testing Wireless Communication Networks Using Selective Fleet Vehicles" and pending provisional patent Application No. 60/505,822 filed Sep. 24, 2003, entitled "Bracket to Hold Mobile Testing Unit in Vehicle". The entire contents of both of these provisional patent applications are incorporated by reference.

FIELD OF THE INVENTION

The following invention generally relates to gathering wireless communication signal data. More particularly, the present invention relates to selected fleet vehicles equipped to gather wireless communication signal data while simultaneously performing other tasks.

BACKGROUND OF THE INVENTION

With the dramatic rise in wireless communication usage among the consuming public, wireless communication providers have become increasingly competitive on both price and quality of service. A primary technique used by wireless providers to gage the quality of their wireless networks is to send vehicles into the field with signal testing devices to gather signal performance data. In many cases, the data gathering process is initiated in response to customer complaints. This technique however, has several disadvantages. First, waiting for customer complaints before initiating data gathering does not instill customer confidence in a wireless provider's service. Second, customers may simply change service providers rather than promptly reporting a dropped call or inadequate service quality.

Furthermore, monitoring a wireless communication network can be very expensive. Typically, a wireless provider will dispatch captive vehicles equipped with signal testing devices for the sole purpose of gathering signal data in a geographic region. A description of the type of signal testing device that can be used to gather the signal data is provided in U.S. Pat. No. 5,991,622 to Henry, Jr. To monitor signal coverage for a wireless network, a major capital investment is required for the vehicles and the testing equipment. The wireless provider will also incur the ongoing maintenance and labor expenses for operating the vehicles. Due to this high cost, wireless providers may be forced to forego routine testing of their communication networks and rely on customer complaints to target the testing.

Therefore, an unsatisfied need exists for improved systems and methods for gathering wireless communication data that overcome the deficiencies in the prior art, some of which are discussed above.

BRIEF SUMMARY OF THE INVENTION

The present invention seeks to provide more efficient systems and methods for gathering wireless communication data. In furtherance of this goal, the invention seeks to use vehicles already operating in a target area for other purposes to simultaneously gather the desired data. The present invention accomplishes these goals by providing improved systems and methods for positioning a signal testing device into selected fleet vehicles. Vehicles that traverse the target area are selected, and one or more signal testing devices are positioned in the selected vehicles. The signal testing devices gather the signal data from transmission towers while positioned in selected fleet vehicles.

In one aspect of the invention, a system for gathering wireless communication signal data is provided that includes a fleet of vehicles equipped for performing a task other than wireless communication signal testing, a plurality of mounting brackets installed into a plurality of the fleet of vehicles, and one or more wireless communication signal testing devices capable of being sequentially positioned in the plurality of mounting brackets. In alternative embodiments, the fleet vehicles may operate according, at least in part, to a predefined dispatch plan or within an assigned geographic area. The system may also include a plurality of external antennae configured to communicate with the signal testing device.

In another aspect of the present invention, a method for gathering wireless communication signal data for a target geographic area using selected fleet vehicles is provided. This method includes the steps of: selecting a plurality of fleet vehicles, wherein the selected vehicles traverse the target geographic area, operating the plurality of fleet vehicles, positioning one or more signal testing devices in one or more of the plurality of selected fleet vehicles in a mounting bracket attached to each of the fleet vehicles, transferring one or more of said signal testing devices to a different selected fleet vehicle, and gathering wireless communication signal data using the signal testing device when present in each of the plurality of fleet vehicles. This method may also include transferring the gathered data to a third party. The transmission of the data may be wireless, on a tangible medium or via the Internet. In one embodiment, a signal testing device is sequentially positioned in a plurality of fleet vehicles. In an alternative embodiment, the fleet vehicles are selected based in part on their expected routes.

In an additional aspect of the present invention, a method for gathering wireless communication signal data using fleet vehicles is provided. The method includes the steps of: receiving a first instruction designating a target geographic area, selecting a first vehicle of a fleet of vehicles assigned to a route passing within the target geographic area designated by the first instruction, positioning a wireless communication signal testing device in the first vehicle, operating the first vehicle to perform a task other than testing of wireless communications, simultaneously operating the signal testing device in the first vehicle to collect wireless communications test data, receiving a second instruction designating a target geographic area, selecting a second vehicle of a fleet of vehicles assigned to a route passing within the target geographic area designated by the second instruction, positioning the wireless communication signal testing device in the second vehicle, operating the second vehicle to perform a task other than testing of wireless communications, and simultaneously operating the signal testing device in the second vehicle to collect wireless communications test data. In one embodiment, the first and second instructions identify the same target geographic area. Additionally, the first and second fleet vehicles may be equipped with mounting brackets configured to accept a signal testing device.

BRIEF DESCRIPTION OF THE SEVERAL VIEWS OF THE DRAWINGS

Figure 1:
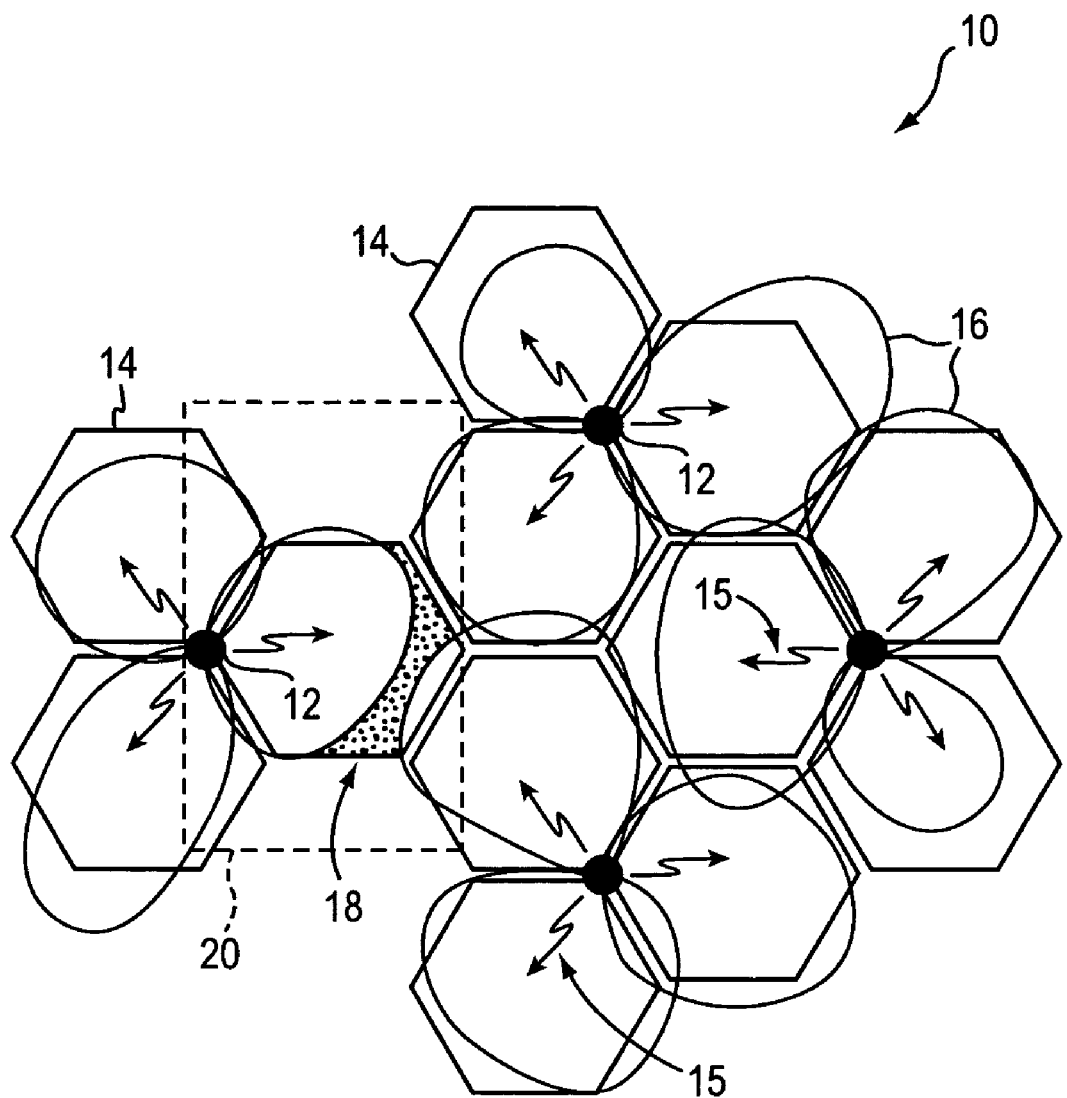

Having thus described the invention in general terms, reference will now be made to the accompanying drawings, which are not necessarily drawn to scale, and wherein:

FIG. 1 illustrates a wireless communication network having multiple transmission towers providing signal coverage for multiple hexagonal cells.

Figure 2:
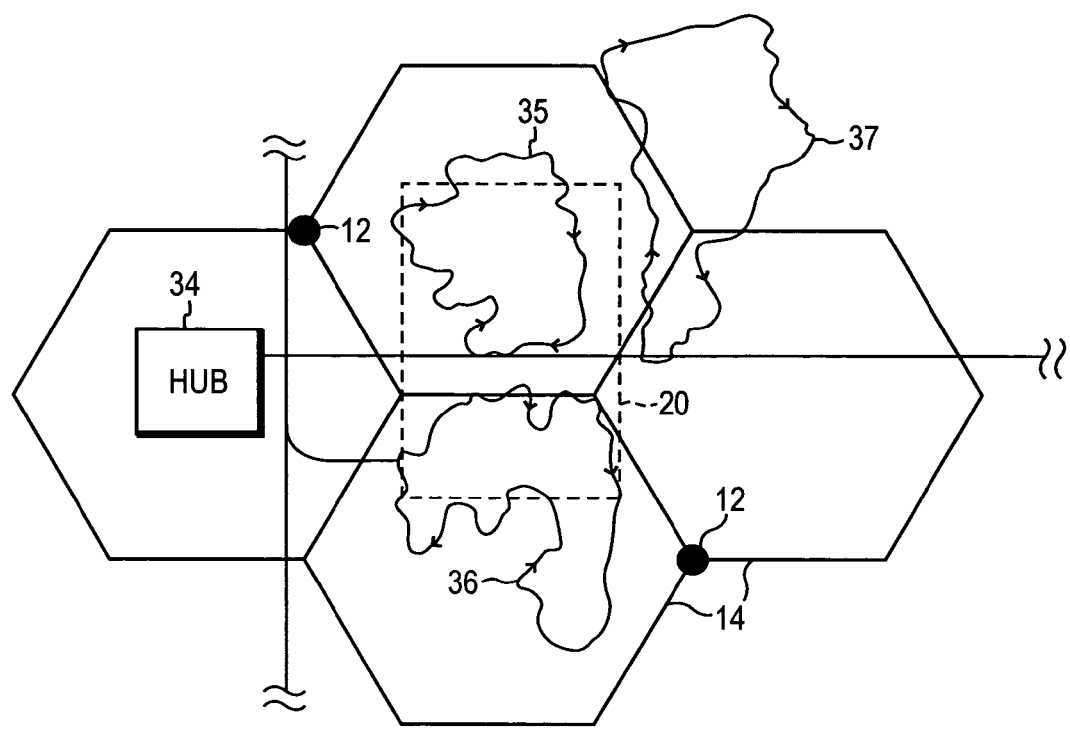

FIG. 2 illustrates a package delivery dispatch plan having multiple routes for servicing a given geographic area and hexagonal cells for a wireless communication network overlaid thereon.

Figure 3:
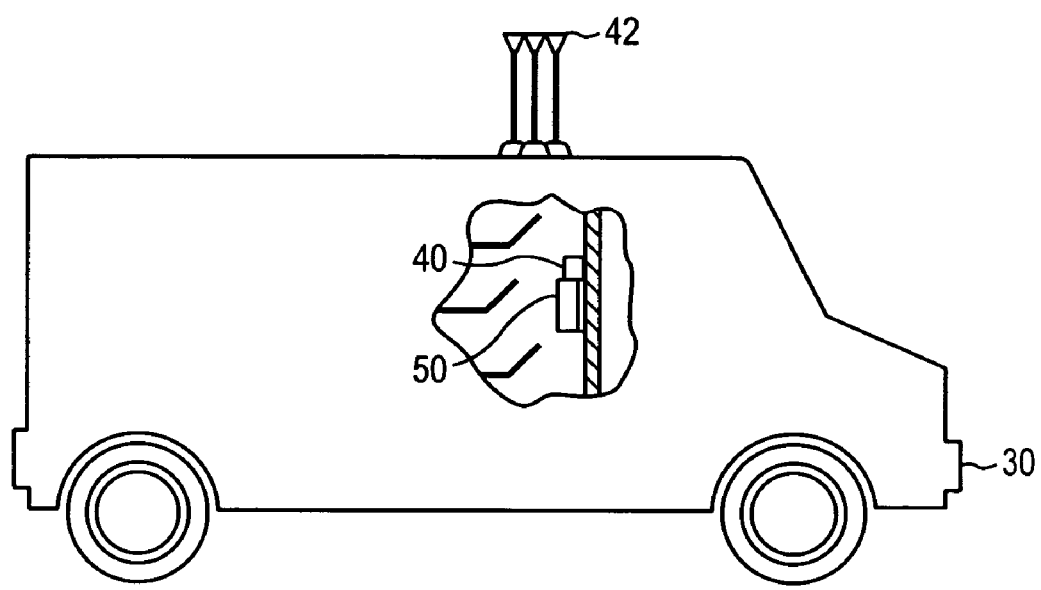

FIG. 3 is a schematic view of a delivery vehicle with a signal testing device positioned therein in accordance with an embodiment of the present invention.

Figure 4:
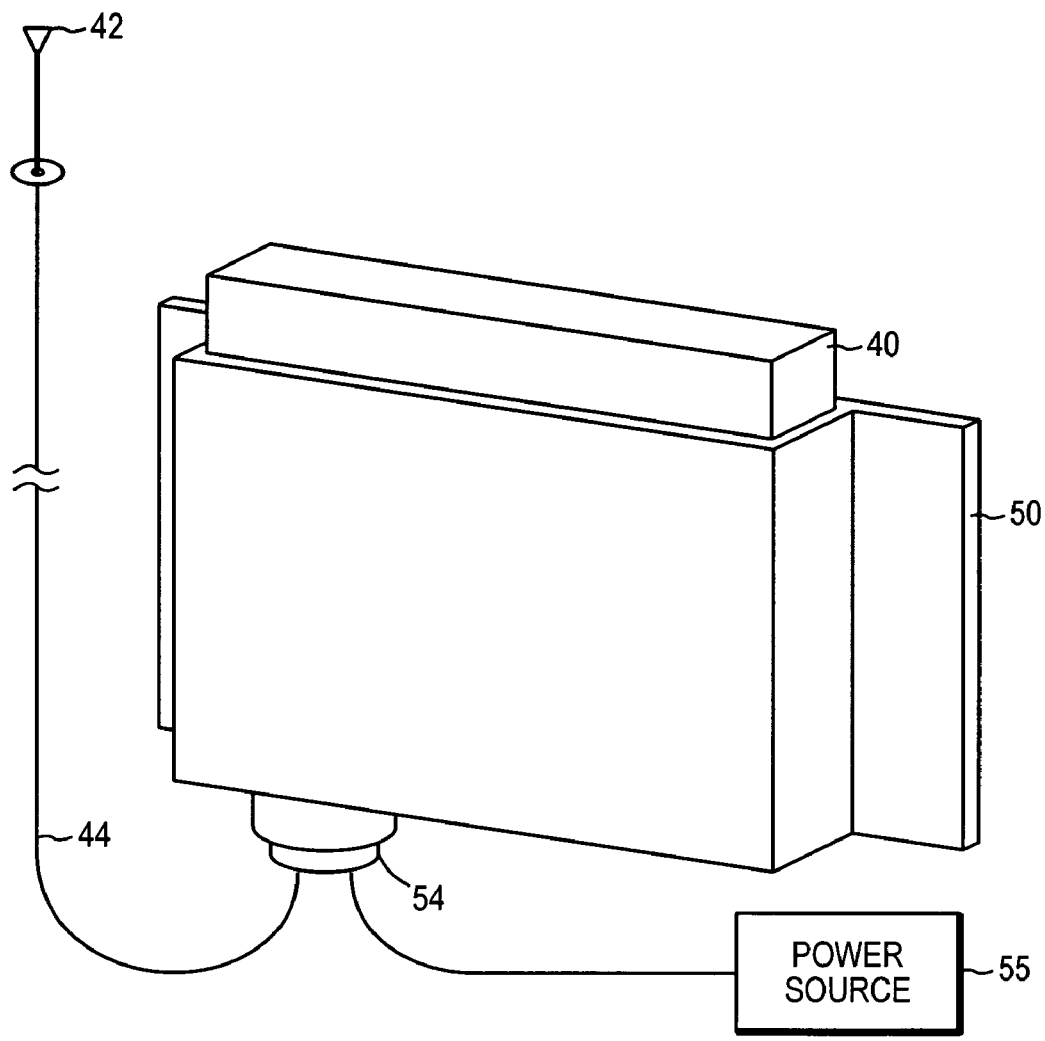

FIG. 4 is a schematic view of a signal testing device installed in a mounting bracket in accordance with an embodiment of the present invention.

Figure 5:
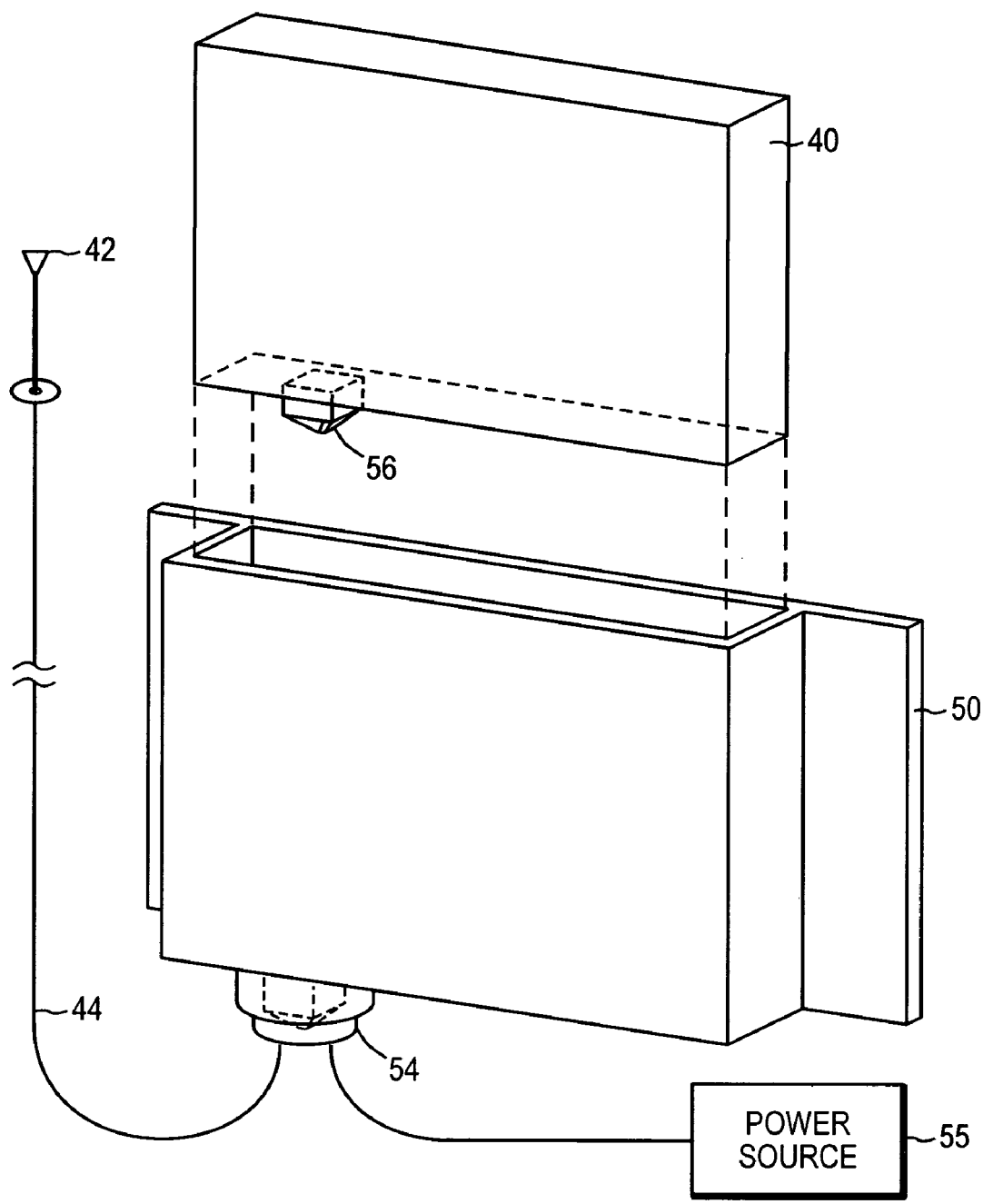

FIG. 5 is an exploded view of a signal testing device and a mounting bracket in accordance with an embodiment of the present invention.

Figure 6:
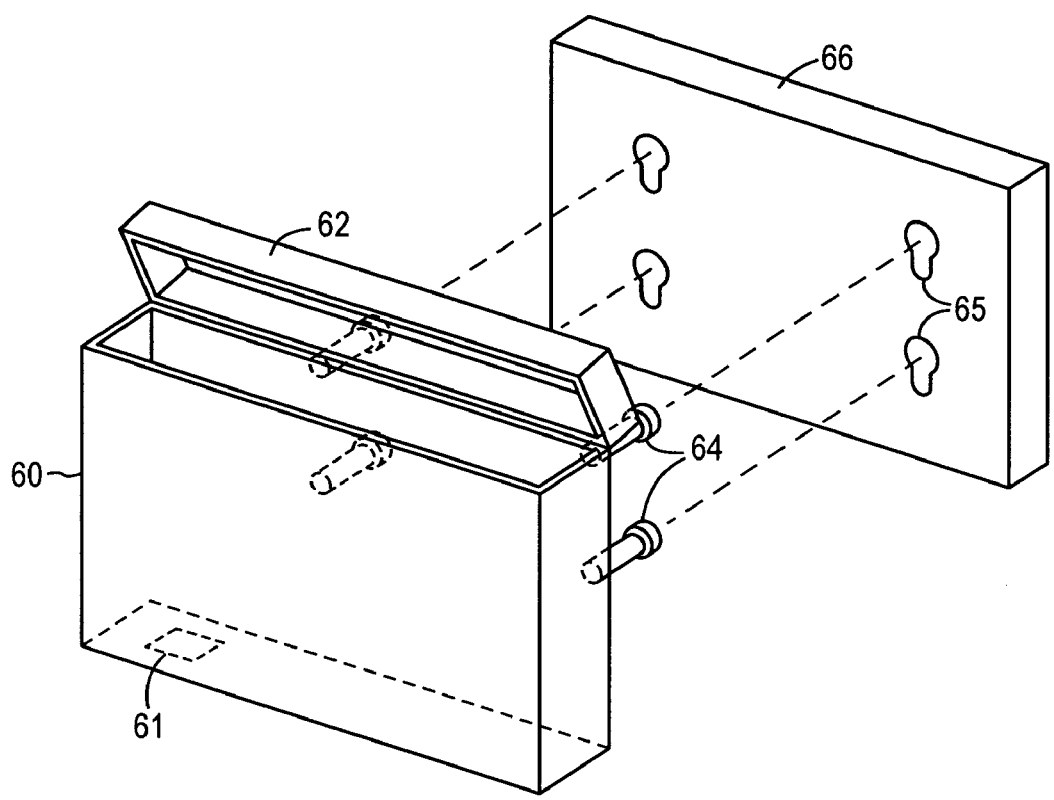

FIG. 6 is an exploded view of a mounting bracket in accordance with an embodiment of the present invention.

Figure 7:
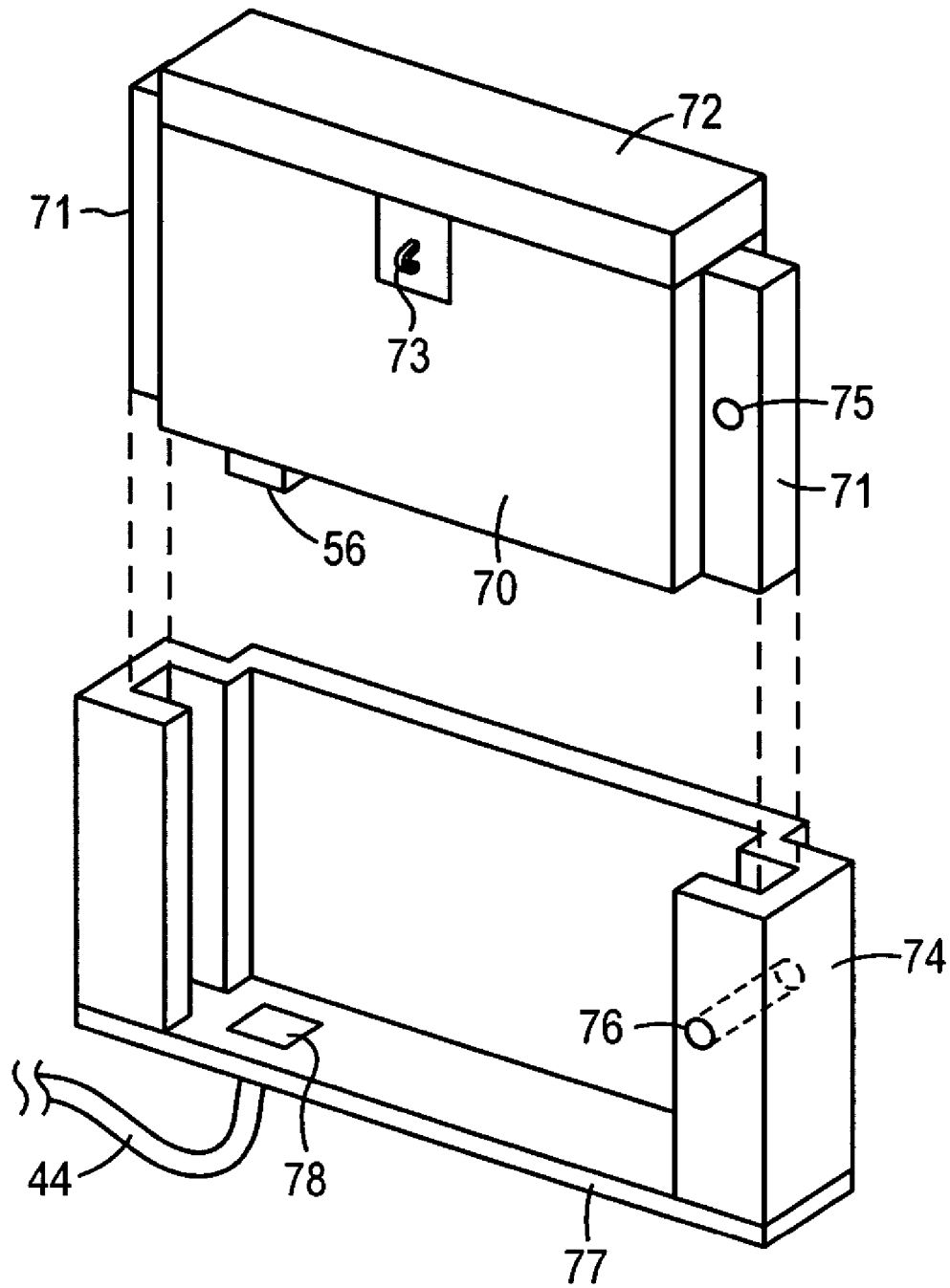

FIG. 7 is an exploded view of a mounting bracket in accordance with an embodiment of the present invention.

Figure 8:
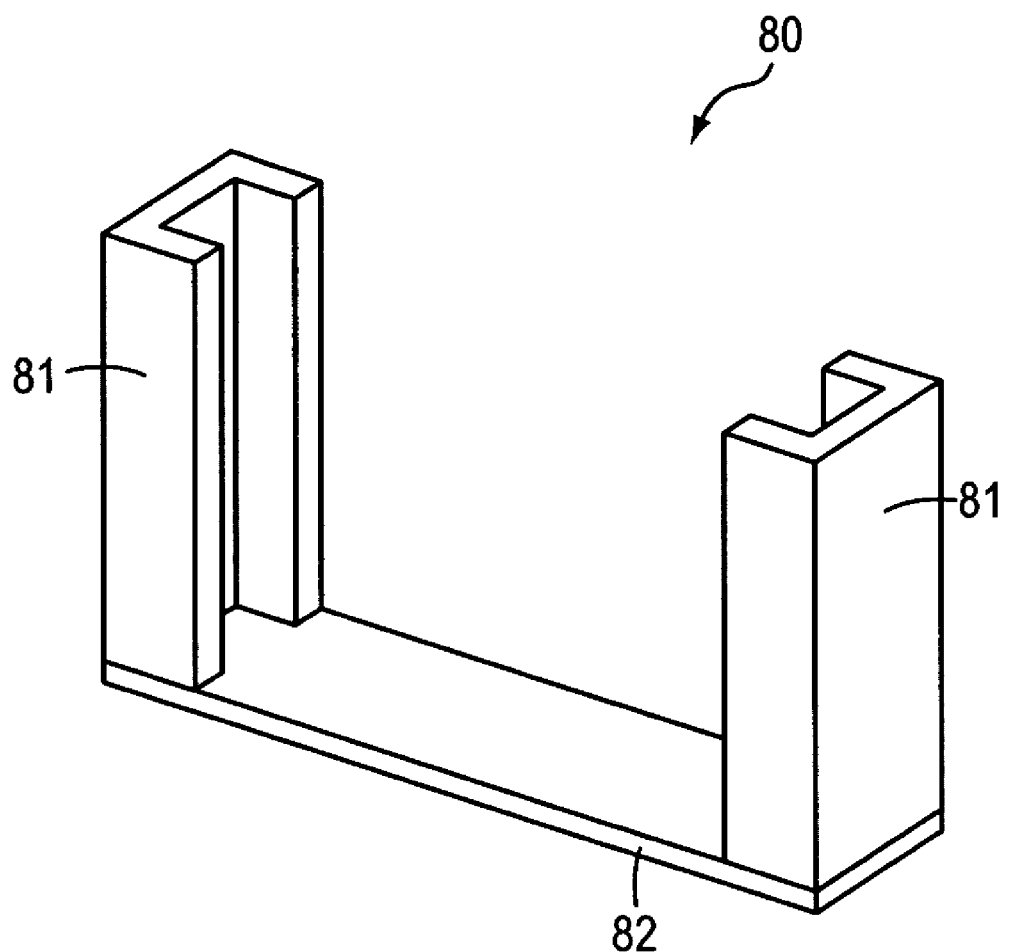

FIG. 8 is a schematic view of a mounting bracket in accordance with an embodiment of the present invention.

Figure 9:
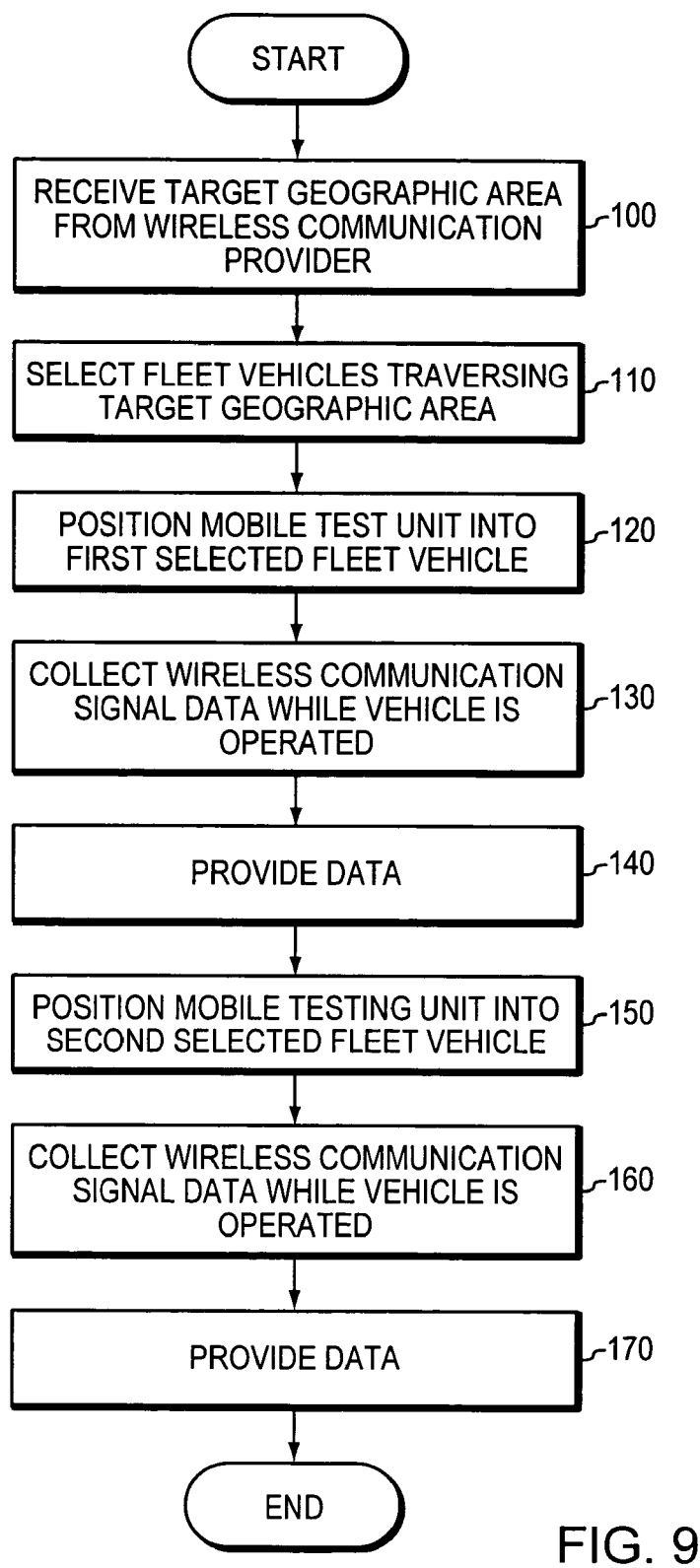

FIG. 9 is a process flow diagram illustrating a method in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. However, the manner in which some terms are used may be disclosed.

The present invention is directed at systems and methods for gathering wireless communication data within a target geographic area. More specifically, selected fleet vehicles are used to gather wireless communication data from transmission towers while simultaneously performing other tasks. Vehicles that traverse the target area are selected, and a signal testing device is sequentially positioned in the selected vehicles. The signal testing device gathers the signal data from transmission towers while temporarily positioned in a selected fleet vehicle.

As illustrated in FIG. 1, a wireless communication network 10 comprises multiple cell towers 12 dispersed in a given geographic area. When designing a wireless communication network 10, the geographic area is divided into hexagonal cells 14 with each cell tower 12 providing wireless communication signals 15 to several of these hexagonal cells 14. In theory, each cell tower 12 provides complete signal coverage for three hexagonal cells 14. However, signal coverage varies based on terrain and the presence of manmade structures; therefore, the actual signal coverage or sector 16 for a given cell tower 12 may not cover the entire assigned hexagonal cells 14. As a result, gaps 18 in coverage may occur. A more detailed description of how a cellular network operates can be found in U.S. Pat. No. 6,519,452 to Agostino et al., which is incorporated herein by reference.

Wireless communication providers seek to minimize the gaps 18 in their communication networks because gaps 18 represent areas in which customers will lose service. To this end, wireless providers identify target geographic areas 20 to monitor wireless communication signal performance based on customer complaints. Alternatively, the wireless providers may target an area due to new manmade structures, or simply to monitor the performance of their existing equipment or competitors' equipment. Continuous monitoring of existing equipment is also advantageous to ensure current capacity meets the demand. Otherwise, customer calls may be blocked or dropped due to a lack of capacity in the current equipment.

In a preferred embodiment of the present invention, a wireless communication provider cooperates with a fleet operator for the purpose of using fleet vehicles already performing other tasks to simultaneously gather wireless communication signal data. The other tasks may include, without limitation, delivering packages, transporting people, and servicing customers. A benefit of this embodiment is that the wireless provider no longer has the expense of dispatching captive vehicles to gather data because the fleet vehicles are already operating in the target area for other reasons.

In one embodiment, a fleet of package delivery vehicles is used in connection with the present invention as illustrated in FIG. 2. Conventional package delivery fleets operate out of a series of delivery hubs 34. A dispatch plan assigns each delivery vehicle a route 35, 36, 37 that includes a sequence of stops. Typically, the geographic area serviced by an individual delivery vehicle remains static while the dispatch plan or actual route for the delivery vehicle changes based on the packages to be delivered, the day of week or the season. Cell towers 12 provide wireless communication signals for multiple hexagonal cells 14 for the same geographic area in which the delivery vehicles operate. In alternative embodiments, the fleet vehicles may be buses or trolleys that follow the same route every day, or taxis that generally operate on a series of one-way fares. It will be obvious to those skilled in the art that any fleet vehicle operating in a geographic area may be utilized in connection with the present invention.

In a preferred embodiment, a signal testing device 40 is positioned in a fleet vehicle 30 to gather wireless communication data as illustrated in FIG. 3. The signal testing device 40 collects data while the driver attends to his primary responsibilities. Generally, the signal testing device 40 makes and received test calls and gathers speech quality data and data transfer rates for each of these test calls. More specifically, the data collected may include active/candidate state, handoff state, neighbor list warnings, pilot pollution, and strongest pilot. The data is stored in log files and maybe transmitted to a central database for processing. As will be obvious to one of skill in the art, any signal testing device 40 known in the art may be used in connection with the present invention.

The signal testing device 40 may also include an integrated GPS receiver to capture location coordinates while collecting wireless communication signal measurements. In alternative embodiments, the signal testing device 40 may use triangulation or a LORAN system to provide location coordinates. The location data allows the presentation of the gathered signal data on a map for improved analysis.

The signal testing device 40 gathers wireless communication data via a plurality of antennae. Preferably, the antennae are provided with the signal testing device 40. However, the construction of the fleet vehicle may interfere with the gathering of the communication signal data using these antennae. For example, a metal roof on a delivery vehicle may interfere with the communication signal. Moreover, some signal testing devices 40 may not provide antennae. In either case, the present invention may provide access to a plurality of external antennae 42 via cable 44 as illustrated in FIGS. 3 and 4. Preferably, whether external or internal, one antenna collects location data while the remaining antennae gather wireless communication data. In an alternative embodiment, one of these antennae also transmits the gathered data to the wireless communication provider. As will be obvious to one skilled in the art, the quantity of antennae is based on the choice of signal testing device 40 and as discussed above, any signal testing device 40 may be used in connection with the present invention.

To facilitate the positioning and removal of the signal testing device 40, the fleet vehicles are preferably equipped with mounting brackets 50 configured to accept the signal testing devices 40 as best shown in FIG. 4. In this embodiment, the mounting bracket 50 provides a sleeve portion that is closed at one end and dimensioned to accept a signal testing device 40. The mounting bracket 50 also has two flanges that facilitate attachment to a vehicle. The attachment may be accomplished using bolts, screws, welding, or any other fastening methods known in the art.

The mounting brackets 50 are preferably located in an accessible area to facilitate positioning and removing of the signal testing device 40. In the embodiment illustrated in FIG. 3, the mounting bracket 50 is affixed to a partition between the driver's compartment and the cargo compartment of a package delivery vehicle. This location is easily accessible and does not intrude into the space typically reserved for packages.

Preferably, the mounting bracket 50 is configured to accept a variety of signal testing devices 40. This feature provides the flexibility of allowing the user to choose the best signal testing device 40 for the particular data-gathering task. However, the mounting brackets 50 may be customized to accept a single manufacture's signal testing device 40.

Turning to FIG. 5, the mounting bracket 50 is preferably configured with an integral connector 54 that provides a communication link to external antennae 42 via cable 44. The signal testing device 40 is configured with a mating connector 56 that engages the bracket connector 54 when the signal testing device 40 is positioned in the mounting bracket 50. The integral connector 54 may also provide a connection to a power source 55.

In an alternative embodiment shown in FIG. 6, the signal testing device 40 (not shown) is placed in a protective container 60 to facilitate securing to a mounting bracket 66. In this embodiment, the protective container 60 is dimensioned to receive the signal testing device and is preferably configured with a lid 62. The lid 62 is preferably secured with a hasp (not shown) or other locking mechanism known in the art. Preferably, access to an integral connector 56 (not shown) of the signal testing device is provided via hole 61.

The protective container 60 is temporarily secured to the mounting bracket using mounting pins 64 that protrude from the back of the protective container 60 and engage keyholes 65 in the mounting bracket 66. Preferably, the mounting pins 64 have a cylindrical body portion and a relatively larger diameter head portion. In a preferred embodiment, the mounting pins 64 are bolts or screws. The corresponding keyholes 65 in the mounting bracket 66 have a cylindrical top portion dimensioned to accept the head portion of the mounting pins 64 and a relatively smaller diameter cylindrical bottom portion. Alternatively, the signal testing device 40 itself may be configured with mounting pins 64 and may be directly secured to the mounting bracket without the aid of a protective container 60.

In an alternative embodiment, a protective container is configured with a guide rail system rather than the mounting pins described above. In this embodiment, a protective container 70 is configured with two planar rails 71 as illustrated in FIG. 7. Preferably, the protective container 70 also provides a lid 72 that is secured with a hasp 73 as shown or any other retaining mechanism known in the art. The mounting bracket 74 is dimensioned to accept the protective container 70 and the planar rails 71. Preferably, the protective container 70 and mounting bracket 74 have corresponding lock receiving portions 75 and 76, respectively. The lock receiving portions 75, 76 align when the protective container 70 is positioned in the mounting bracket 74. The lock receiving portions 75, 76 are dimensioned to accept a padlock, locking cylinder or other locking mechanism known in the art. This locking feature not only secures the protective container 70 to the mounting bracket 74, but also deters unauthorized removal.

The mounting bracket 74 is preferably configured with a bottom plate 77 that aids in securing and locating the protective container 70 into the mounting bracket 74. The bottom plate 77 is preferably configured with an integral connector 78 that engages a mating connector 56 on the signal testing device 40. The integral connector 78 may provide access to external antennae or a power source via cable 44 as desired. In an alternative embodiment, the planar rails are attached directly to the signal testing device 40 allowing installation of the signal testing device 40 to the mounting bracket 74 without the protective container 70.

In a further embodiment shown in FIG. 8, a mounting bracket 80 provides a pair of inwardly facing channels dimensioned to receive a signal testing device (not shown). The mounting bracket also provides a bottom plate 82 to aid in locating and securing the signal testing device. As will be obvious to one of ordinary skill in the art, any mounting bracket configuration that facilitates the positioning and removal of the signal testing device may be employed in connection with the present invention.

In a preferred embodiment, all or a portion of a fleet of vehicles are equipped with mounting brackets 50, but only a limited number of signal testing devices 40 are utilized. A fleet operator identifies fleet vehicles assigned to routes that traverse the target geographic area 20 and transfers the limited number of signal testing devices 40 between the identified vehicles to gather the desired data. A benefit of this aspect of the invention is that the initial capital costs of the system are relatively low because the mounting brackets 50 are relatively inexpensive. On the other hand, purchasing multiple signal testing devices 40 can be very expensive.

A preferred method for using selected fleet vehicles to gather wireless communication data from transmission towers in accordance with the present invention is illustrated in the process flow diagram shown in FIG. 9. The process begins at step 100 with the fleet operator receiving the target geographic area 20. The target geographic area 20 is preferably identified on a map using zip codes, cross streets or landmarks. As will be recognized by one skilled in the art, any identifiable boundary may be used to identify the target geographic area 20 in connection with the present invention. A map specifying the target geographic area 20 is preferably provided in an electronic format that is readable by signal testing device 40. Alternatively, the data may be received by the fleet operator and converted into a format that is readable by the signal testing device 40.

After receiving the target geographic area 20, the fleet operator identifies fleet vehicles that traverse the target geographic area 20 at step 110. One or more vehicles may be identified at this step. The number of fleet vehicles required to gather data for a given target geographic area 20 depends on the size of the target geographic area 20 and the number of fleet vehicles having a portion of their assigned route traversing the target geographic area 20. It should be noted that complete testing coverage by the selected fleet vehicles is not a requirement of the present invention. Moreover, it may not be possible to provide complete coverage due to time constraints, route variations and the like.

At step 120, the fleet operator positions a signal testing device 40 into the mounting bracket 50 of a first fleet vehicle identified at step 110. Preferably, step 120 includes engaging a connector 56 incorporated in the signal testing device 40 with a mating connector 54 positioned in the mounting bracket 50 to provide an electronic communication with a power source and external antennae as required.

The signal testing device 40 gathers wireless communication data while the driver of the first fleet vehicle performs his primary responsibilities at step 130. Preferably, the signal testing device 40 initiates data collection as the driver of the first fleet vehicle starts a shift. In an alternative embodiment, the data collection is delayed until the first fleet vehicle enters the target geographic area 20. Preferably, the signal testing device 40 is programmed to automatically initiate data collection based on a GPS location signal. Alternatively, the driver may manually initiate data collection as the first vehicle enters the target geographic area 20. In a further embodiment, the data collection is initiated at a specified time based on a signal testing device internal clock. A benefit of delaying the initiation of data collection is that it reduces the quantity of data to be processed.

Preferably, the signal testing device 40 collects data continuously until the first fleet vehicle completes a shift. Alternatively, the data collection may stop automatically or manually as the first fleet vehicle exits the target geographic area 20. In a further embodiment, the data collecting stops at a specific time according to a signal testing device internal clock.

At step 140, the data is provided to the wireless communication provider. Preferably, the data is transmitted directly from the signal testing device 40 to the wireless communication provider by wireless transmission periodically during the day, as the fleet vehicle exits the target geographic area 20, or after data gathering is complete for the target area 20. The wireless data transmission may be via a cellular network, a wireless local area network or the like. Alternatively, the data may be wirelessly transmitted from the signal testing device 40 to the fleet operator's network. In turn, the fleet operator may transmit the data to the wireless provider via landlines or provide access to the data via the Internet. In a further embodiment, the data is provided to the wireless provider on any tangible medium known in the art such as, for example, a flash memory card, magnetic disc, or optical disc.

After data collection is completed for the first fleet vehicle, the signal testing device 40 is removed and positioned into a second fleet vehicle at step 150. The signal testing device 40 may remain in the first vehicle for multiple days or shifts before transferring to a second vehicle. Preferably, the transfer occurs at the end of a shift for the first fleet vehicle; however, the transfer may occur during a shift if the data is needed quickly. In one embodiment, the second fleet vehicle traverses the same target geographic area 20 as the first fleet vehicle and provides additional coverage for the target area 20. In an alternative embodiment, the second fleet vehicle provides testing coverage for a second target geographic area.

At step 160, the signal testing device 40 collects data while the driver of the second fleet vehicle services customers according to his assigned route. The data is then provided to the wireless provider at step 170. Preferably, the signal testing device 40 is transferred to other selected fleet vehicles until all the selected vehicles have carried the signal testing device 40 or until the desired data for the target geographic area 20 is collected. The positioning may be sequential or a selected vehicle may carry the signal testing device 40 more than once to provide testing coverage for a given target geographic area.

A method of the present invention will now be described with reference to a package delivery fleet shown in FIG. 2. The package delivery fleet operator receives the target geographic area 20 and applies it against the dispatch plans for the fleet of delivery vehicles. Route 35 and route 36 traverse the target geographic area 20 and therefore vehicles assigned to these routes are selected for the purpose of gathering wireless communication data.

The fleet operator positions a signal testing device 40 into the fleet vehicle assigned to route 35. The signal testing device 40 gathers data while the driver services route 35. At the end of a shift, the signal testing device 40 is transferred to the vehicle assigned to route 36. Likewise, the signal testing device 40 collects data while this driver services route 36. As one of skill in the art will recognize, the signal testing device 40 may remain in a vehicle for multiple shifts before it is transferred to a different vehicle. Finally, the data collected is transferred to the wireless communication provider.

In one embodiment, the fleet operator owns the signal testing device 40 and the data is supplied as a product. In this embodiment, the fleet operator cooperates with a plurality of wireless providers in a given area to gain access to their communication networks. The wireless providers' networks are typically distinguished by frequency and by a system identifier. The fleet operator selects vehicles to provide testing coverage for a given area such as an entire city, or metropolitan area. A limited number of signal testing devices 40 are sequentially positioned into these fleet vehicles and data is continuously accumulated and updated. Preferably, each signal testing device 40 is configured to make test calls on multiple wireless networks while the drivers service their routes. The data for each wireless provider's network is segregated according to a system identifier, which is collected from the transmission towers' signal during test calls. The fleet operator may provide comparative data for multiple network providers or data for a single provider. In an alternative embodiment, the fleet operator initiates testing after a wireless communication provider specifies signal parameters to be monitored and a target geographic area 20. In this embodiment, the fleet operator selects the appropriate fleet vehicles and sequentially positions a signal testing device 40 into the selected vehicles to gather the desired data.

In another embodiment, the wireless communication provider owns the signal testing device 40. In this embodiment, the wireless communication provider specifies the target geographic area 20 and provides the signal testing device 40 to the fleet operator. The fleet operator then selects the appropriate fleet vehicles and sequentially positions the signal testing device 40 into the selected vehicles. Preferably, the vehicles operated by the fleet operator are equipped with mounting brackets 50 that facilitate efficient positioning of the signal testing device 40 into the selected fleet vehicle. The data is gathered while the drivers perform their primary responsibilities and the signal testing device 40 is removed and returned when the data gathering is complete. In this embodiment, the fleet operator does not incur the expense of purchasing and maintaining the signal testing device 40. Moreover, the wireless communication provider may select the signal testing device 40 that provides the optimum data gathering capabilities for their purposes.

In a further embodiment, the wireless communication provider leases space on a fleet of vehicles to accommodate the signal testing device 40. Preferably, the wireless communication provider equips all or a portion of a fleet of vehicles with mounting brackets 50 configured to accept the signal testing device 40. The wireless communication provider identifies the target geographic area 20 and supplies the fleet operator with a signal testing device 40. The fleet operator then gathers the data. Preferably, the fleet operator includes the vehicle selection and signal testing device 40 positioning service as part of the lease.

In conclusion, this invention provides systems and methods for gathering wireless communication data using selected fleet vehicles. The data gathering is accomplished while the drivers of the fleet of vehicles are simultaneously performing other tasks such as delivering goods or people or traveling to service calls. Both the fleet operator and the wireless communication provider benefit from this invention. The wireless communication provider obtains critical signal data without employing captive vehicles for the purpose of gathering the data. The fleet operator gains an additional revenue stream without altering the drivers' assigned duties. Furthermore, the ability to sequentially transfer a limited number of signal testing devices 40 between fleet vehicles equipped with mounting brackets 50 significantly reduces the initial capital costs to gather the data.

Further, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Although the foregoing invention description uses a cell phone communication network as an example, it will be readily apparent that the present invention may be used for testing any voice or data transmission system using wireless technology such as radio or television broadcasts, wireless local area networks (Wi-Fi) and the like. Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for gathering wireless communication signal data for a target geographic area using selected fleet vehicles, said method comprising the steps of:
selecting a first and a second vehicle from a plurality of fleet vehicles based at least in part on the pre-determined route of the first and second vehicles traversing said target geographic area;
positioning a signal testing device in a mounting bracket attached to the selected first vehicle;
gathering wireless communication signal data within said target geographic area using said signal testing device when present in said first vehicle;
transferring said signal testing device from said first vehicle to said second vehicle after said first vehicle has gathered wireless communication signal data within said target geographic area; and
gathering wireless communication signal data using said signal testing device within said target geographic area using said signal testing device when present in the second vehicle.

2. The method of claim 1, further comprising the step of transferring the gathered data to a third party.

3. The method of claim 2, wherein said transferring is by wireless transmission.

4. The method of claim 2, wherein said transferring includes storing data on a tangible medium and transferring said tangible medium.

5. The method of claim 2, wherein said transferring includes downloading the information from said testing device and providing access to the data via the Internet.

6. The method of claim 1, wherein said mounting bracket comprises a pair of inwardly facing channels dimensioned to receive said signal testing device therebetween and configured to removeably secure the signal testing device to the vehicle.

7. The method of claim 1, wherein said signal testing device is provided by a third party.

8. The method of claim 1, wherein said signal testing device is provided by said fleet operator.

9. The method of claim 1, wherein said step of transferring said signal testing device is repeated until data for substantially the entire target geographic area is gathered.

10. The method of claim 1, wherein said step of transferring said signal testing device is repeated until at least one of said one or more signal testing devices has been positioned in each of said selected vehicles.

11. The method of claim 1, wherein said step of transferring said signal testing device is sequential for the plurality of fleet vehicles.

12. The method of claim 1, wherein said step of gathering data is based at least in part on a location signal.

13. The method of claim 1, wherein said step of gathering data is based at least in part on a specified start and stop time.

14. A method for gathering wireless communication signal data using fleet vehicles, said method comprising the steps of:
receiving a first instruction designating a first target geographic area;
selecting a first vehicle of a fleet of vehicles based at least in part on the expected route of said first vehicle passing within said target geographic area designated by said first instruction;
positioning a wireless communication signal testing device in said first vehicle;

operating said first vehicle to perform a primary task other than testing of wireless communications;

simultaneously operating said test device in said first vehicle to collect wireless communications test data;

receiving a second instruction designating a second target geographic area;

selecting a second vehicle of said fleet of vehicles based at least in part on the expected route of said second vehicle passing within said target geographic area designated by said second instruction;

transferring said wireless communication signal testing device from said first vehicle to said second vehicle;

operating said second vehicle to perform a task other than testing of wireless communications; and simultaneously operating said signal testing device in said second vehicle to collect wireless communications test data.

15. The method of claim 14, wherein said first and second target geographic area are substantially the same geographic area.

16. The method of claim 14, further comprising the step of equipping said first and second fleet vehicles with a mounting bracket configured to accept a signal testing device and wherein said mounting brackets comprise a pair of inwardly facing channels spaced apart to receive said wireless communication signal testing device and a bottom plate attached proximate an end of each channel and wherein the bottom plate includes an integral connector configured to engage a connector in said wireless communication signal testing device.

17. The method of claim 16, wherein said positioning steps comprise placing the signal testing device in said mounting bracket.

18. The method of claim 14, further comprising the step of transferring the collected data to a third party.

19. The method of claim 18, wherein said transferring of data is by wireless transmission.

20. The method of claim 18, wherein said transferring of data step includes storing data on a tangible medium and transferring said tangible medium.

21. The method of claim 18, wherein said transferring of data step includes downloading the information from said testing device and providing access to the data via the Internet.

22. The method of claim 14, wherein said signal testing device is provided by a third party.

23. The method of claim 14, wherein said signal testing device is provided by said fleet operator.

24. The method of claim 14, wherein said step of collecting data is based at least in part on a location signal.

25. The method of claim 14, wherein said step of collecting data is based at least in part on a specified start and stop time.

\* \* \* \* \*

UNITED STATES PATENT AND TRADEMARK OFFICE
CERTIFICATE OF CORRECTION

PATENT NO. : 7,660,577 B2
APPLICATION NO. : 10/947548
DATED : February 9, 2010
INVENTOR(S) : Radosta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this

Thirtieth Day of November, 2010

David J. Kappos
*Director of the United States Patent and Trademark Office*